Oct. 2, 1934.   C. J. KELLER   1,975,155
COILED WIRE CUTTING MACHINE
Filed July 23, 1932   7 Sheets-Sheet 7

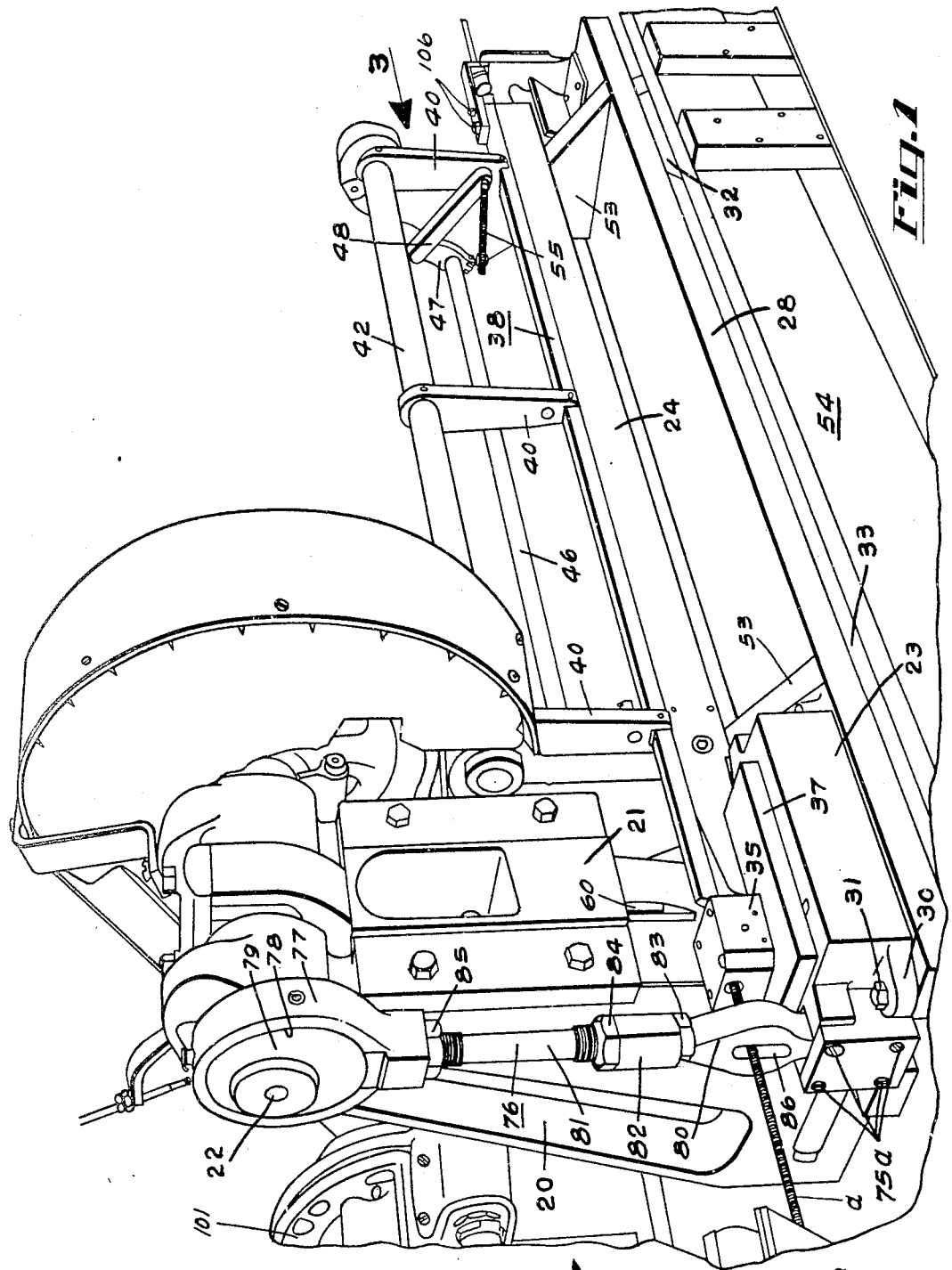

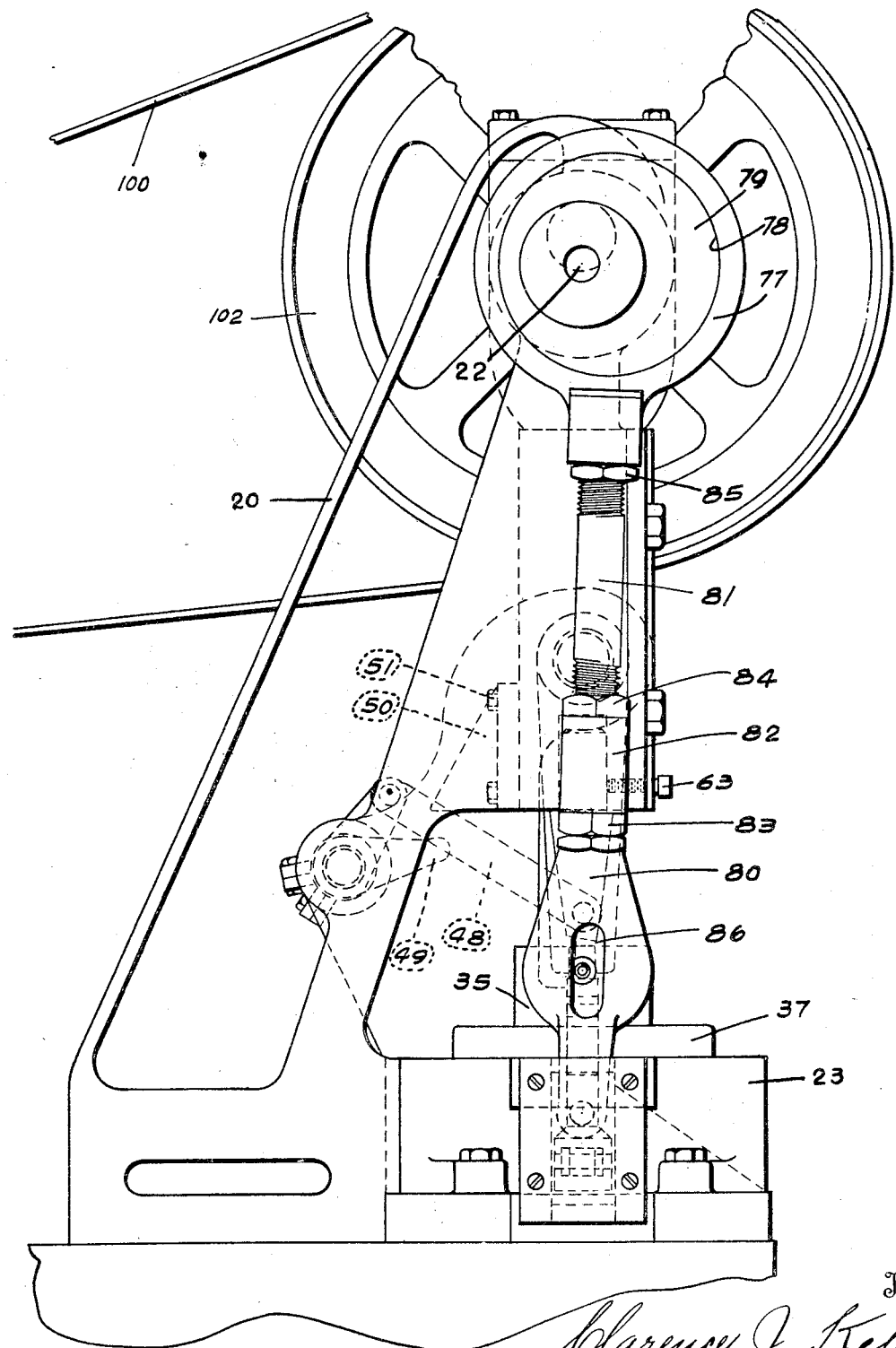

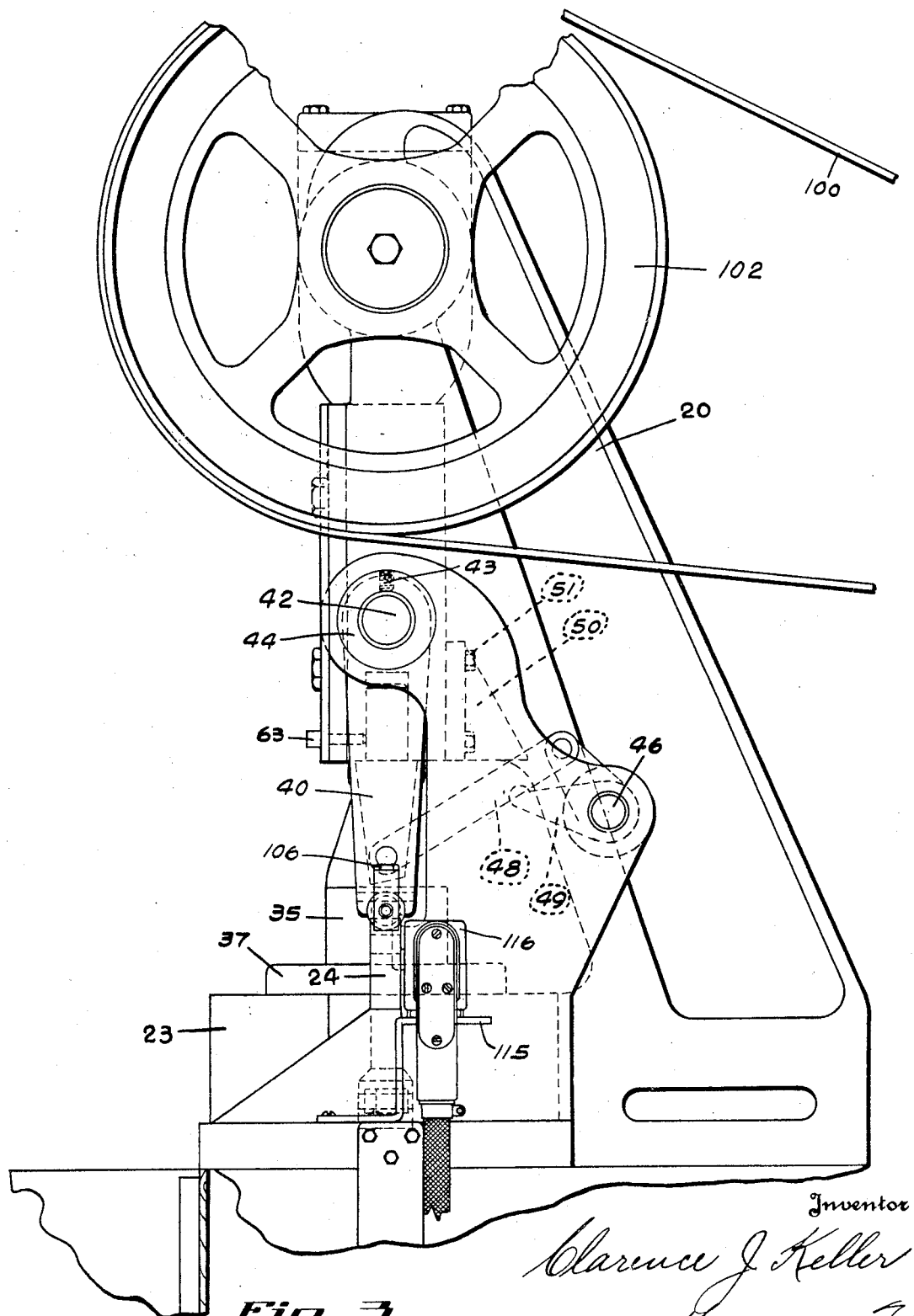

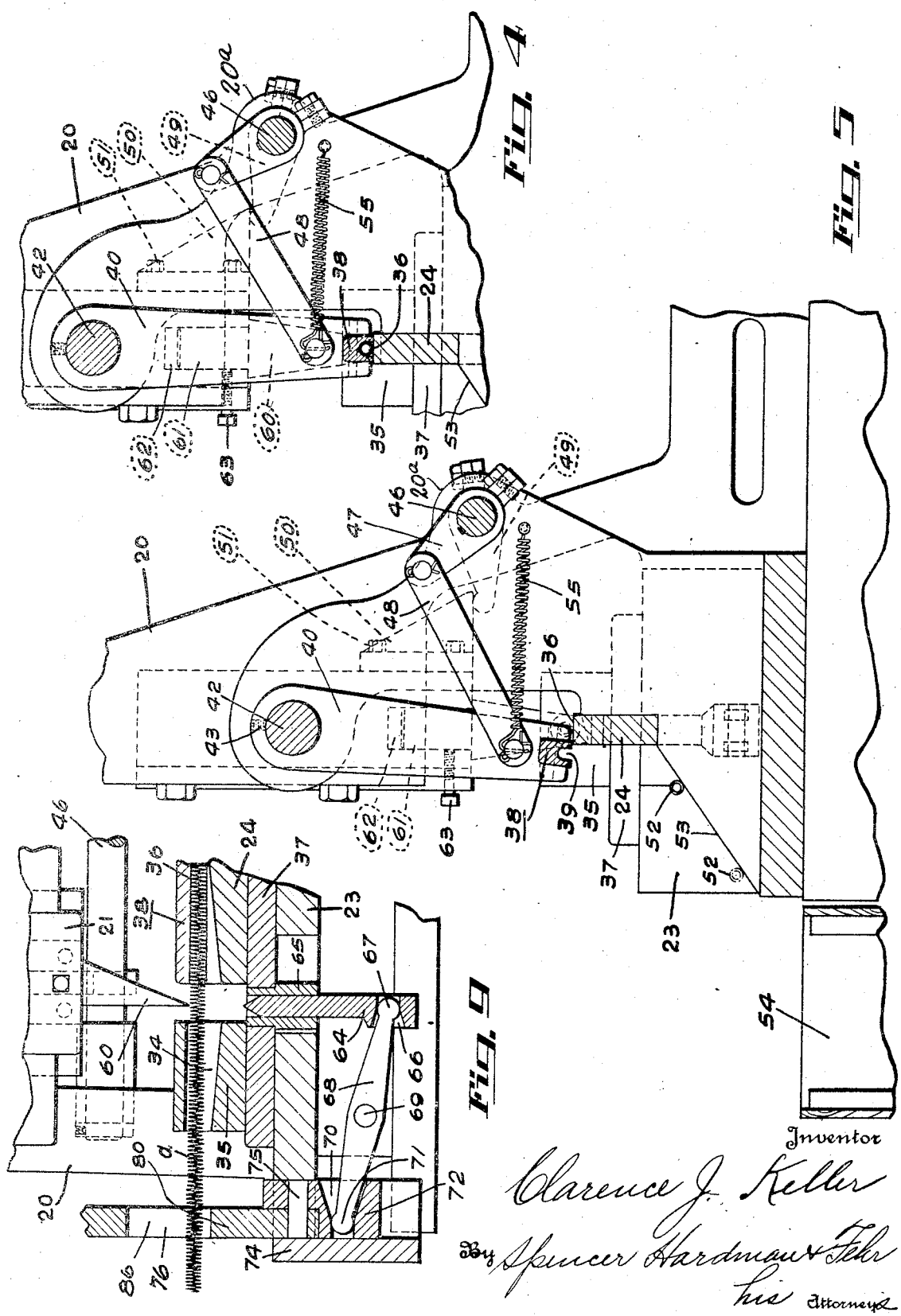

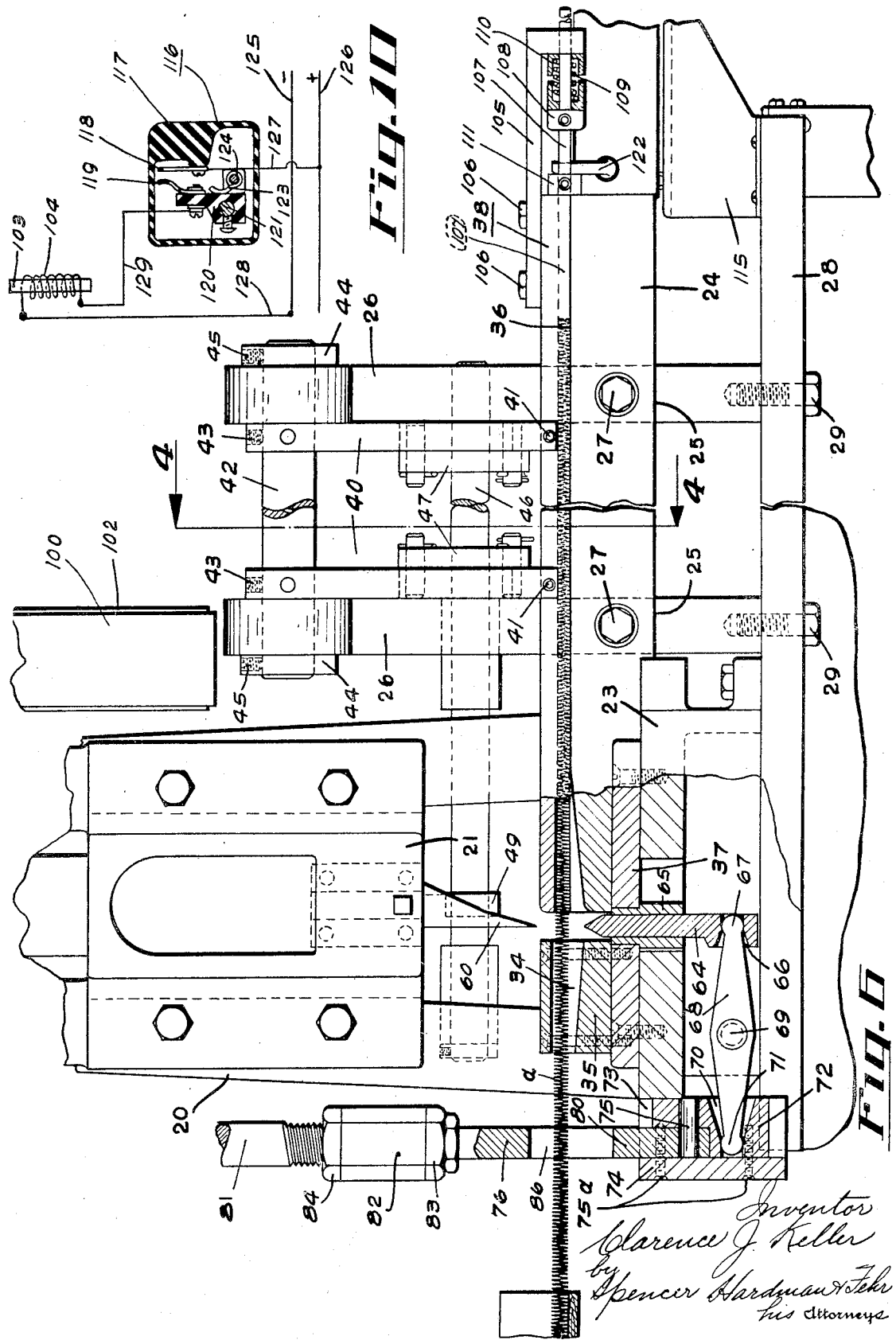

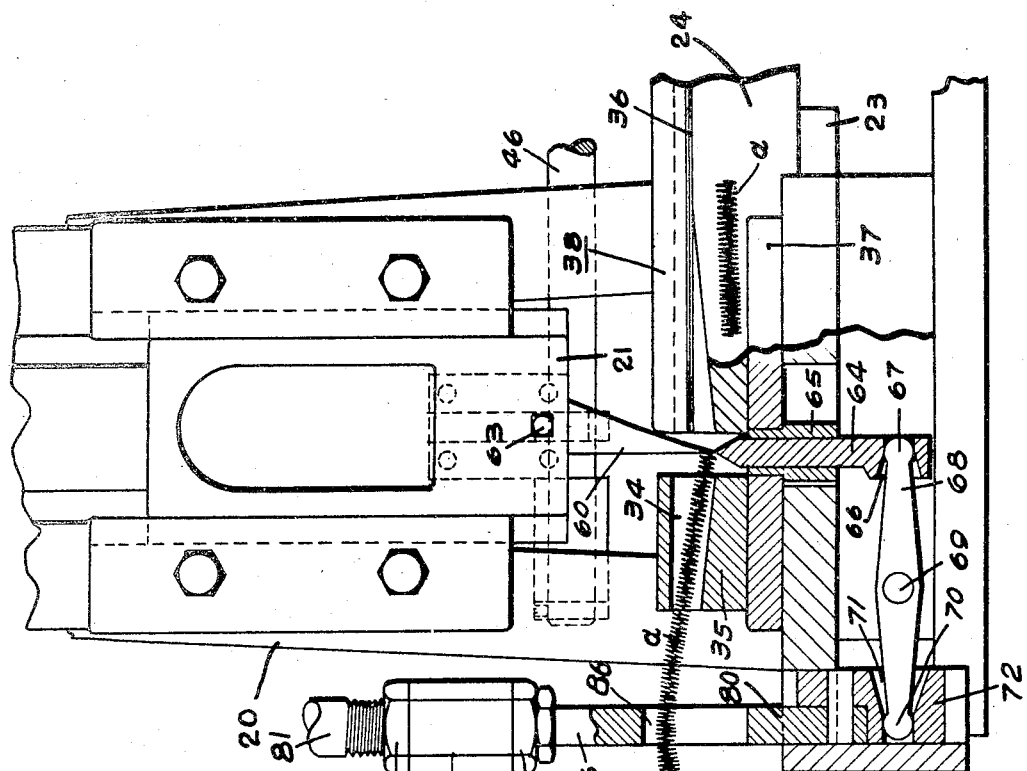

Inventor
Clarence J. Keller
By Spencer Hardman & Fehr
his Attorneys

Patented Oct. 2, 1934

1,975,155

UNITED STATES PATENT OFFICE 1,975,155

COILED WIRE CUTTING MACHINE

Clarence J. Keller, Anderson, Ind., assignor, by mesne assignments, to General Motors Corporation, Detroit, Mich., a corporation of Delaware Application July 23, 1932, Serial No. 624,217

21 Claims. (Cl. 140—145)

This invention relates to machines for automatically severing predetermined lengths of coiled wire.

It is among the objects of the present invention to provide means for automatically cutting predetermined lengths of coiled wire without stopping the feeding of the coiled wire into the machine. The wire coil severing machine is adapted for use with a wire coiling machine for forming wire into a continuous length of helically coiled wire capable of use as flexible casings for Bowden wire controls and the like. As the coiled wire issues at a steady rate from the wire coiling machine it passes to a wire coil severing machine embodying the present invention in which latter machine the coiled wire is severed into predetermined lengths without interrupting the steady issue of the coiled wire from the wire coiling machine.

Further objects and advantages of the present invention will be apparent from the following description, reference being had to the accompanying drawings wherein a preferred embodiment of one form of the present invention is clearly shown.

In the drawings:

Fig. 1 is a perspective view of the machine embodying the present invention.

Fig. 2 is a fragmentary view of the machine looking in the direction of arrow 2 in Fig. 1.

Fig. 3 is a fragmentary view of the machine looking in the direction of arrow 3 in Fig. 1.

Fig. 4 is a fragmentary sectional view taken on the line 4—4 of Fig. 6.

Fig. 5 is a view similar to Fig. 4 showing, however, the overhanging wire guide or track in a different position.

Fig. 6 is a fragmentary front elevation of the machine, showing in section the relative positions of the cooperating knives while in normal or resting position.

Fig. 7 shows the relative positions of the co-operating knives in which they sever a coiled wire.

Fig. 8 shows the relative positions of the two cooperating knives shortly after the severing operation has taken place.

Fig. 9 shows the relative positions of the two cooperating knives shortly before they return into resting position again.

Fig. 10 is a sectional view through a switch connecting any suitable electric source with the windings of an electromagnetic clutch throw-out pin.

Figure 11:
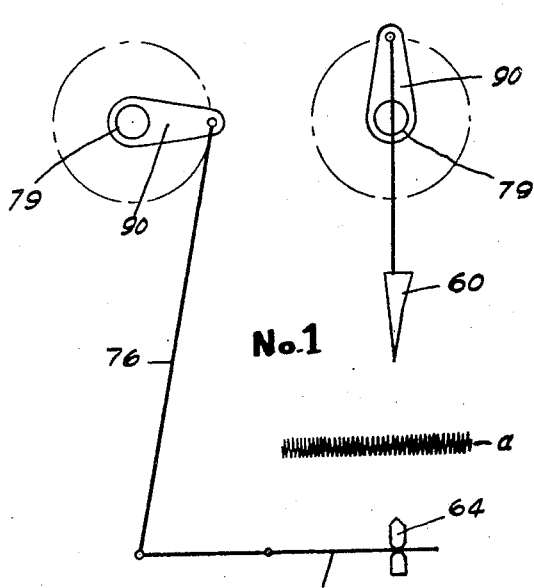

Figs. 11 to 14 inclusive, are diagrammatic views illustrating successive steps of concurrent knife movements during one wire severing operation.

Referring to Figs. 1 and 6, a punch-press frame 20 is shown having a head or ram 21 which is reciprocated by a crank shaft 22, and a bolster plate 23. A rectangular bar or wire support 24 is located on projecting surfaces 25 of a pair of spaced pedestals 26 and secured thereon by screws 27. Each one of the pedestals is attached to a platform 28 by screws 29, the platform 28 is attached to lugs 30 of bolster plate 23 by screws 31 and supported by legs 32 and 33.

Wire track and its functions

A coiled wire $a$ is continuously fed from a wire coiling machine (not shown) through the aperture 34 of a block 35 and then over the top surface 36 of support 24. Block 35 is screwed onto a plate 37 which in turn is mounted in any suitable manner on bolster plate 23. The fed wire is guided for linear movement over top surface 36 of support 24 by an overhanging wire guide 38 which provides a rectangular, longitudinal groove 39, said guide being attached to the biased ends of a plurality of levers 40 by screws 41. The overhanging wire guide 38 and the support 24 form a laterally movable wire track. Levers 40 are journaled on a shaft 42 which extends parallel to support 24. A plurality of set screws 43 prevent said levers from rotary movement relative to shaft 42 which is rotatably mounted on the pedestals 26 and prevented from longitudinal movement in any direction by collars 44 which are adjustably mounted on shaft 42 by set screws 45. Wire guide 38 may be moved laterally of the support 24 in order to remove a severed length of coiled wire from the top surface 36 of said support by rocking shaft 42. For this purpose the pedestals 26 rotatably-support another shaft 46 (see Figs. 5 and 6) which is also rotatably supported in a bearing provided by a boss 20a of the punch-press frame. Shaft 46 carries a plurality of levers 47 each one of which is connected by a link 48 with a lever 40. As the levers 47 abut pedestals 26, endwise movement of the shaft is prevented in any direction as can be readily understood. Also attached to shaft 46 is a rocking lever 49 which, when engaged by a bracket 50, attached to the movable ram 21 by screws 51, rocks shaft 46 and levers 47 counter-clockwise as viewed in Figs. 4 and 5, thereby rocking levers 40 and shaft 42 clockwise as viewed in the same figures through the link connections 48. As can readily be understood from Figs. 4 and 5, a severed length of coiled wire 52 is removed by the clockwise moving wire guide 38 from the top surface 36 of support 24 and drops onto inclined surfaces 53 provided by the pedestals 26, from where the coiled wire rolls into any suitable receptacle such as a long box 54. The wire guide 38 is urged into the position shown in Fig. 4 by springs 55 which tend to rock levers 46 counter-clockwise.

Wire cutting mechanism

Referring more particularly to Figs. 2 and 6 to 9, inclusive, a knife or notching member 60 the cutting edge of which extends transverse of the direction of movement of the coiled wire is shown supported with its shank 61 in a recess 62 provided by the movable ram 21 and secured therein by a screw 63 as more clearly shown in Fig. 4. A cooperating knife or notching member 64 which is vertically below 60 and whose cutting edge extends parallel to that of knife 60 is guided for vertical movement through a bushing 65 which is press fitted into plate 37 and extends through bolster plate 23. The lower end of knife 64 provides a socket 66 which receives the roller shaped end 67 of a lever 68 which is pivoted as at 69 to the bolster plate 23. The other end 70 of lever 68 is also roller shaped and is received in a socket 71 of a block 72 which is vertically slidable in a groove 73 of the bolster plate and retained within said groove by a plate 74, attached to bolster plate 23 by screws 75a. Pivoted to block 72 by a pin 75 is a connecting rod 76 which is threaded into a ring member 77 (see Figs. 1 and 2) which is rotatably supported on the periphery 78 of a disc 79 which is eccentrically mounted on the concentric end of crank shaft 22 in any suitable manner. Ring member 77 is prevented from lateral movement relative to the eccentric disc 79 by any suitable means such as an annular groove in the periphery of the eccentric disc and a cooperating annular ridge of the ring member 77. Connecting rod 76 comprises two parts 80 and 81, connected with each other by a tubular member 82 which threadedly received the adjacent ends of parts 80 and 81. The length of connecting rod 76 and therewith the position of knife 64 may be adjusted by turning tubular member 82 as can be readily understood. Locknuts 83 and 84 prevent loosening of the threaded connection between tubular member 82 and parts 80 and 81, respectively. A locknut 85 prevents loosening of the threaded connection between the connecting rod 76 and ring member 77. As may be best seen in Figs. 1 and 2, part 80 of the connecting rod 76 would obstruct the feeding movement of the coiled wire if there were not provided an oblong slot 86 in said part, through which the coiled wire extends. Slot 86 is large enough to permit the connecting rod to travel through its prescribed path without interfering with the movement of the coiled wire.

Figure 12:
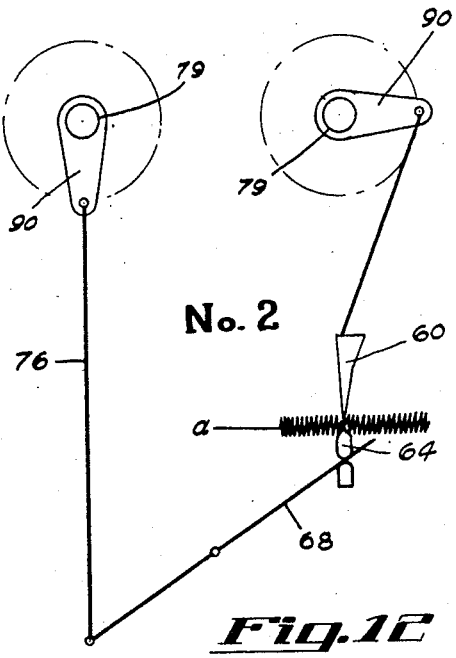
Figure 13:
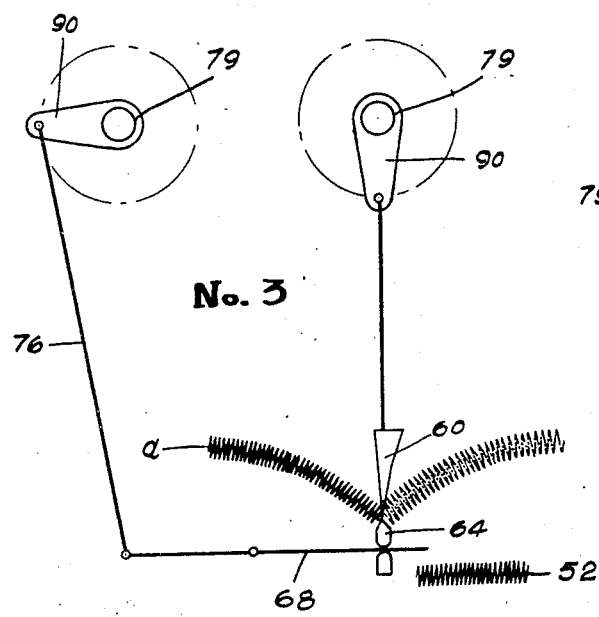
Figure 14:
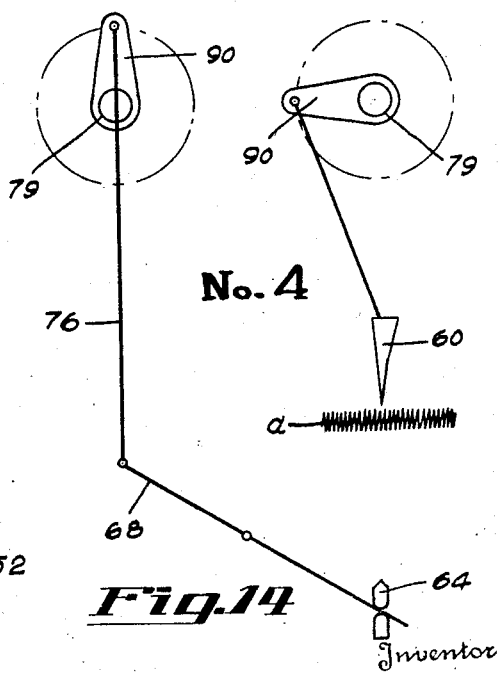

It may be stated in advance that one severing operation takes place during one complete revolution of crankshaft 22. One severing operation shall now be described detailedly with special reference to Figs. 6 to 9 inclusive, and 10 to 14 inclusive. The latter group of figures shows diagrammatically the relative positions of the crank 90 of crankshaft 22 and the eccentric disc 79 which for the sake of simplicity is illustrated in the form of a crank arm. Figs. 6 and 11 show the relative positions of the knives 60 and 64 and the relative positions of crank 90 and eccentric disc 79 in resting position. During the first quarter revolution of the crankshaft 22 knife 60 descends due to the movement of crank 90 from point "1" to point "2" as viewed in Figs. 11 and 12, while concurrently therewith knife 64 rises due to the movement of the eccentric disc 79 from "1'" to point "2'". The eccentricity of disc 79 and the proportions between the length of connecting rod 76, the lengths of the arms of lever 68 and the size of crank 90 have been so selected that the cutting edges of the knives 60 and 64 nearly touch each other when crank 90 and eccentric disc 79 reach the position as shown in Fig. 12, and while moving from that position to the one shown in Fig. 13. This means that after a quarter revolution of the crankshaft the coiled wire is deeply notched from opposite sides by the knives 60 and 64 depending upon the adjustment of knife 64. During the next quarter revolution of crankshaft 22 and eccentric disc 79 from the position shown in Fig. 12 to that shown in Fig. 13, knife 60 continues its descending movement due to the movement of crank 90 from point "2" to points "3" while concurrently therewith knife 64 also descends due to the movement of the eccentric disc 79 from point "2'" to point "3'" as viewed in Figs. 12 and 13. The relative positions of knives 60 and 64 as shown in Fig. 8 correspond with those in Fig. 13, in which positions the continuously fed coiled wire is obstructed by knife 60 and is therefore flexed as can be seen in Fig. 8. As will be seen from Fig. 13 the descending knives 60 and 64 cause the notched portion to bend slightly thereby causing the wire to break on the notched portion. During the next quarter revolution of crankshaft 22 and eccentric disc 79 knife 60 rises from the position shown in Fig. 13 to that shown in Fig. 14 due to the movement of crank 90 from point "3" to "4", while concurrently therewith knife 64 continues its descending movement due to the movement of eccentric disc 79 from point "3'" to point "4'" as viewed in Figs. 13 and 14. The relative positions of the knives 60 and 64 as shown in Fig. 14 correspond with those in Fig. 9. As may be seen from Fig. 9 the coiled wire is now allowed to continue its feeding movement into the groove of the overhanging guide 38. During the last quarter revolution knife 60 continues its rising movement due to the return of the crank 90 from point "4" to point "1" while concurrently therewith knife 64 reverses its direction of movement and rises due to the movement of eccentric disc 79 from point "4'" to point "1'".

Drive of crankshaft and control

Referring more particularly to Figs. 1, 3 and 10 a belt 100 is shown which drivingly connects an electric motor 101 with a flywheel 102 which is rotatably supported on crank shaft 22. A suitable one revolution clutch (not shown) such as a Toledo pin clutch for instance, is adapted drivingly to connect flywheel 102 with crank shaft 22. As this type of a clutch is well known to those skilled in the art it is deemed unnecessary to show or detailedly describe the clutch. It is sufficient to state that the throwout pin 103 which is normally wedged between the clutch parts in order to prevent driving engagement between said parts, may be electro-magnetically withdrawn from between the clutch parts whereupon they drivingly engage each other under spring action. Therefore, when an electro-magnetic winding 104 is energized, throwout pin 103 will be withdrawn whereupon the clutch drivingly connects the continuously rotating flywheel 102 with the crank shaft. The energizing of the electro-magnet winding 104 is controlled by the movable coiled wire as will be described presently. Referring particularly to Figs. 6 and 10 there is shown a bracket 105 secured to the over-hanging guide 38 by screws 106 which slidably support one end of a bar 107 which is also slidable within the groove of the overhanging guide. Mounted on bar 107 is a cup shaped member 108 which receives a spring 109 surrounding bar 107. Spring 109 is also received within a cup 110 which is loosely supported on bar 107 and urged against bracket 105 by the spring which is held under compression by a collar 111 mounted on bar 107 and resting against the end of the over-hanging guide 38. The forward end of the fed coiled wire engages bar 107 within the groove of the overhanging guide and moves the same toward the right against the tendency of spring 109 whereupon the parts carried by bar 107 are slightly moved toward the right as viewed in Fig. 6.

Mounted on a bracket 115 which in turn is mounted on the platform 28 is a switch 116, (see Fig. 3) which comprises an insulating housing 117, a stationary contact blade 118, and a cooperating contact blade 119 which is carried by an insulating rocker arm 120 mounted in any suitable manner on a stud 121 rotatably supported by housing 117 and terminating outside of said housing into an extending arm 122. A leaf spring 123 carried by a pin 124 which is secured to the housing 117 in any suitable manner urges the rocker arm 120 in counter-clockwise direction as viewed in Fig. 10, thereby maintaining the contact blades 118 and 119 separated and urging arm 122 into engagement with collar 111. Any suitable source of electric power (not shown) is connected through line wires 125 and 126 and connection 127 and 128 respectively, with stationary contact blade 118 and one end of the electromagnetic winding 104, respectively. A wire 129 connects the other end of winding 104 with contact blade 119. It may be understood from the foregoing that during the described slight movement of bar 107 toward the right as viewed in Fig. 6, arm 122 is slightly rocked in clockwise direction by collar 111 whereupon contact blade 119 moves into engagement with contact blade 118 thereby closing the electro-magnetic circuit which has just been described. Throwout pin 103 will then be withdrawn and the one-revolution clutch will drivingly connect flywheel 102 with crankshaft 22.

*Mode of operation*

In order to start the machine operating, motor 101 is started which drives flywheel 102. As soon as the foremost end of the fed coiled wire engages bar 107, arm 122 is slightly rocked thereby effecting driving engagement of the clutch parts of the one revolution clutch by electro-magnetically withdrawing throw-out pin 103 from between said clutch parts. Crank shaft 22 and eccentric disc 79 move through the various positions shown in Figs. 11 to 14, inclusive, during one revolution. As explained earlier the notching of the moving coiled wire takes place at the end of the first quarter revolution of cam shaft 22, and over-hanging wire guide 38 and therewith a severed length of coiled wire is moved laterally of the support 24 during rotation of crankshaft 22 through the second quarter revolution as can be understood from Figs. 4, 5, 12 and 13. The coiled wire which is only notched from opposite sides, and hence still connected with the rest of the coiled wire, is caused to break on the notched portion by the concurrent downward movement of the knives into the position No. 3 in Fig. 13 which movement caused the wire to bend on the notched portion. It is evident that with the removal of the severed length of coiled wire from track 38, bar 107 is returned under spring action into the position shown in Fig. 6, whereupon switch arm 122 is urged into the position shown in the same figure by leaf spring 123, contact blades 118 and 119 are separated and the magnet energizing circuit interrupted. The throw-out pin is therefore before the end of one complete revolution of crank shaft 22 free to move under spring action between the drivingly engaged clutch parts and disengage the same at the end of one revolution of the crank shaft.

The wire track returns into the position shown in Fig. 4 during the third quarter revolution of the crank shaft when the ram 21, carrying knife 60 moves from the position shown in Fig. 8 to that shown in Fig. 9, in which position knife 60 just clears the coiled wire whereupon the same continues its feeding movement over support 24 and within the groove of aligned guide 38, until the foremost end of the wire again engages and shifts bar 107 slightly toward the right as viewed in Fig. 6 whereupon a new severing operation takes place in the just described manner.

While the form of embodiment of the present invention as herein disclosed, constitutes a preferred form, it is to be understood that other forms might be adopted, all coming within the scope of the claims which follow.

What is claimed is as follows:

1. In a machine for severing lengths of wire from a supply wire, two reciprocable members for notching and bending the wire upon simultaneous reciprocation of both members while in engagement with the wire whereby the latter breaks apart in the notched portion thereof.

2. In a machine for severing lengths of wire from a supply wire, the combination of two reciprocable members for notching and bending the wire upon simultaneous reciprocation of both members while in engagement with the wire whereby the latter breaks apart in the notched portion thereof; and means for simultaneously reciprocating both members.

3. In a machine for severing lengths of wire from a supply wire, two reciprocable members operating upon opposite sides of the wire successively to notch the same and to cause the wire to bend about the notched portion upon simultaneous reciprocation of both members while in engagement with the wire thereby breaking the latter apart in the notched portion thereof.

4. A machine for severing lengths of wire from a fed supply wire comprising, in combination, a pair of movable notching members; and means for moving both members toward each other and into engagement with the wire so as to notch the same from opposite sides, and for moving the members in unison laterally of the direction of feeding movement of the supply wire while in notching engagement therewith thereby breaking the wire in the notched portion thereof.

5. A machine for severing lengths of wire from a fed supply wire comprising, in combination, two cooperating members for notching the wire from opposite sides upon movement of the members toward each other and for bending the wire about the notched portion upon unitary movement of both members transversely of the direction of feeding movement of the supply wire, thereby breaking the same apart; and a mechanism for moving the members in timed relation with each other.

6. A machine for severing lengths of wire from a fed supply wire comprising, in combination, two members for notching the supply wire from opposite sides upon movement of the same toward each other and for bending the wire about the notched portion thereof upon unitary movement of both members transversely of the direction of feeding movement of the wire while in notching engagement therewith, thereby breaking the wire apart; and means for moving the members in timed relation with each other.

7. A machine for severing lengths of wire from a fed supply wire comprising, in combination, a pair of notching members; means for reciprocating one of the members; and means actuated in response to the operation of the last said means for reciprocating the other member in such manner that both members notch the wire from opposite sides and then move laterally of the direction of feeding movement of the supply wire while in notching engagement therewith, thereby breaking the notched portion of the wire.

8. A machine for severing lengths of wire from a fed supply wire comprising, in combination, a pair of notching members; a rotary shaft; and means on said shaft for moving both members toward each other thereby notching the wire from opposite sides and for moving both members transversely of the direction of feeding movement of the supply wire while in notching engagement therewith, thereby breaking the wire apart.

9. A machine for severing lengths of wire from a fed supply wire comprising, in combination, a pair of notching members; a rotary shaft; means on said shaft for reciprocating one of the members; and means on the shaft for reciprocating the other member, all means on the shaft being so coordinated that both members concurrently notch the wire from opposite sides and then move laterally of the direction of feeding movement of the supply wire while in notching engagement therewith, thereby breaking the wire in the notched portion thereof.

10. A machine for severing lengths of wire from a fed supply wire comprising, in combination, a pair of notching members; a rotary shaft; and means on said shaft for reciprocating both notching members once during one revolution of the shaft and in such manner that both members concurrently notch the wire from opposite sides and then move laterally of the direction of feeding movement of the supply wire while in notching engagement therewith, thereby breaking the wire in the notched portion thereof.

11. A machine for severing lengths of wire from a fed supply wire comprising, in combination, a pair of notching members; means for reciprocating one of the members; means actuated in response to the operation of the last said means for reciprocating the other member in such manner that both members notch the wire from opposite sides and then move laterally of the direction of feeding movement of the supply wire while in notching engagement therewith, thereby breaking the notched portion of the wire; a source of mechanical power; means for drivingly connecting said power source with the means for reciprocating said one member for one operation of both members; and a yielding member engaged by the foremost end of the fed supply wire for indicating the proper length to be cut.

12. A machine for severing lengths of wire from a fed supply wire comprising, in combination, means for notching and bending the supply wire whereby the same breaks apart in the notched portion thereof; a source of mechanical power for operating the last mentioned means; a yielding member engaged and depressed by the foremost end of the wire; and means actuated by the depressing movement of the member for drivingly connecting said power source with the notching and bending means for one operation of the same.

13. A machine for severing lengths of wire from a fed supply wire comprising, in combination, cooperating means operating upon opposite sides of the supply wire successively to notch the same and to cause the wire to bend about the notched portion thereof thereby breaking the same apart; a yielding member at a predetermined distance from the notching and bending means engaged and depressed by the foremost end of the fed supply wire; a source of mechanical power; and means operated by the depressing movement of the member for drivingly connecting the power source with the cooperating means for one severing operation.

14. A machine for severing lengths of wire from a fed supply wire comprising, in combination, two cooperating members for notching the wire from opposite sides upon movement of the members toward each other and for bending the wire about the notched portion thereof upon unitary movement of both members transversely of the direction of feeding movement of the supply wire while in notching engagement therewith, thereby breaking the wire apart; a mechanism for moving the members in timed relation with each other; a yielding member engaged and depressed by the foremost end of the fed supply wire; a source of mechanical power; and means actuated by the depressing movement of the last mentioned member for drivingly connecting the power source with said mechanism for one severing operation.

15. A machine for severing lengths of wire from a fed supply wire comprising, in combination, a pair of notching members; means for reciprocating one of the members; means actuated in response to operation of the last said means for reciprocating the other member in such manner that both members notch the wire from opposite sides and then move laterally of the direction of feeding movement of the supply wire while in notching engagement therewith, thereby breaking the notched portion of the wire; a source of mechanical power; a yielding member engaged and depressed by the foremost end of the wire; and means actuated by the depressing movement of the last mentioned member for drivingly connecting said power source with the means for reciprocating said one notching member for one operation of both notching members.

16. A machine for severing lengths of wire from a fed supply wire comprising, in combination, a pair of notching members; a rotary shaft, means on said shaft adapted during one revolution of the latter to reciprocate the members in such manner that the same concurrently notch the supply wire from opposite sides and then move laterally of the direction of feeding movement of the supply wire while in notching engagement therewith, thereby breaking the wire in the notched portion thereof; a source of mechanical power; a normally disconnected one revolution clutch for drivingly connecting the power source with the shaft; a yielding member engaged and depressed by the foremost end of the supply wire; and means actuated by the depressing movement of the last mentioned member for drivingly connecting the one revolution clutch.

17. A machine for severing lengths of wire from a fed supply wire comprising, in combination, means for notching and bending the supply wire whereby the same breaks apart in the notched portion thereof; a source of mechanical power for operating the notching and bending means; a normally disconnected clutch for drivingly connecting the power source with the notching and bending means for one operation of the same; an electromagnet for controlling operation of the clutch; a normally open switch; a source of electrical power; a circuit connecting the switch and the electromagnet in series with the electrical power source; and means engaged and moved by the foremost end of the fed supply wire for closing the switch whereby the energized electromagnet effects connection of the clutch.

18. A machine for severing lengths of wire from a fed supply wire comprising, in combination, a support for the supply wire; a movable wire guide for guiding the fed supply wire in a certain direction on the support; means for notching and bending the wire whereby the same breaks apart in the notched portion thereof; and means actuated in response to operation of the last said means for moving the wire guide laterally of the direction of feeding movement of the supply wire to eject a severed length thereof from the support.

19. A machine for severing lengths of wire from a fed supply wire comprising, in combination, a support for the supply wire; a movable wire guide for guiding the fed supply wire in a certain direction on the support; a pair of notching members; means for reciprocating one of the members; means actuated in response to operation of the last said means for reciprocating the other member in such manner that both members notch the wire from opposite sides and then move laterally of the direction of feeding movement of the supply wire while in notching engagement therewith, thereby breaking the notched portion of the wire; and means operated in response to reciprocation of one of the members for moving the wire guide laterally of the direction of feeding movement of the supply wire to eject a severed length thereof from the support.

20. A machine for severing lengths of wire from a fed supply wire comprising, in combination, a support for the supply wire; a movable wire guide for guiding the fed wire in a certain direction on the support; means for notching and bending the supply wire whereby the same breaks apart in the notched portion thereof; a source of mechanical power; a yielding member engaged and depressed by the foremost end of the supply wire; means actuated by the depressing movement of the member for drivingly connecting the power source with the notching and bending means for one operation of the same; and means actuated in response to operation of the notching and bending means for moving the wire guide laterally of the direction of feeding movement of the supply wire to eject a severed length thereof from the support.

21. A machine for severing lengths of wire from a fed supply wire comprising, in combination, a support for the supply wire; a movable wire guide for guiding the fed wire in a certain direction on the support; a pair of notching members; means for reciprocating one of the members; means actuated in response to operation of the last mentioned means for reciprocating the other member in such manner that both members notch the wire from opposite sides and then move laterally of the direction of feeding movement of the supply wire while in notching engagement therewith, thereby breaking the notched portion of the wire; a source of mechanical power; a yielding member engaged and depressed by the foremost end of the supply wire; means actuated by the depressing movement of the last mentioned member for drivingly connecting the power source with the means for reciprocating said one notching member for one operation of both notching members; and means operated in response to reciprocation of one of the notching members for moving the wire guide laterally of the direction of feeding movement of the supply wire to eject a severed length thereof from the support.

CLARENCE J. KELLER.